3,280,190
O-LOWER ALKYL-N-CHLOROPHENYL-N',N'-DI-LOWER ALKYL-ISOUREAS

Engelbert Kühle, Cologne-Stammheim, Ludwig Eue, Cologne-Mulheim, and Richard Wegler, Leverkusen, Germany, assignors to Farbenfabriken Bayer Aktiengesellschaft, Leverkusen, Germany, a corporation of Germany
No Drawing. Original application May 31, 1960, Ser. No. 32,570. Divided and this application Dec. 22, 1964, Ser. No. 438,141
Claims priority, application Germany, June 4, 1959, F 28,608; Oct. 10, 1959, F 29,580
5 Claims. (Cl. 260—564)

This is a division of application Serial No. 32,570, filed May 31, 1960, and now abandoned.

This invention relates to and has as its objects new and useful herbicidal compounds and processes for their production. Generally these new compounds are aromatic O-alkyl-isoureas of the following formula

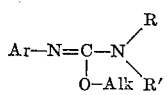

in which Ar denotes an aromatic radical which may be substituted in the nucleus, Alk denotes any aliphatic radical which may also be substituted or interrupted by hetero atoms, R and R' may be identical or different and may stand for hydrogen, alkyl, aryl and cycloalkyl radicals; moreover, R and R' may represent radicals which form together with the nitrogen a five- or six-membered ring which may be interrupted by hetero atoms.

Of further interest are compounds of the above formula in which Alk is defined as lower alkyl up to 4 carbon atoms, and preferably of 1–2 carbon atoms; R and R' are defined as alkyl of 1–4 carbon atoms and Ar is inclusive of the 4-chlorophenyl and 3,4-dichlorophenyl groups.

These compounds may be obtained by either reacting arylimino-halocarbonic acid amides (I) with aliphatic alcohols or arylimino-halocarbonic acid alkyl esters (II) with primary or secondary amines. The two reaction processes are illustrated by the following formula scheme:

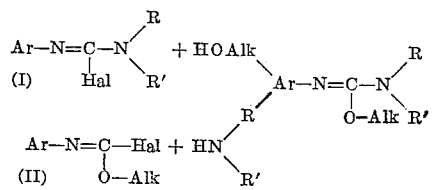

the symbols in these formulae have the same significance as given above, Hal stands for halogen.

Another way for obtaining the new inventive compounds consists in reacting urea-dihalides, especially dichlorides (III) with alcohols in the presence of acid-binding agents or better with alkali metal alcoholates. This possibility may be demonstrated by the following reaction scheme:

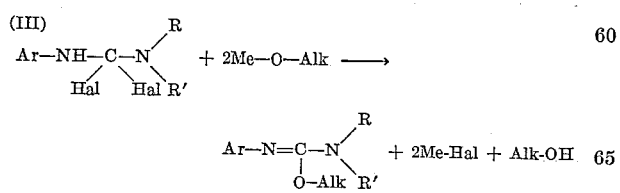

the symbols again in these formulae have the same significance as given above, Me stands for an alkali metal, especially sodium and Hal for halogen, especially chlorine.

The aforesaid starting materials may be obtained by methods known in principle, i.e. by reaction of arylisocyanide-dihalides with ammonium or any primary or secondary aliphatic, cycloaliphatic, aromatic or heterocyclic amine, whereby the arylimino-halocarbonic acid imides (I) are obtained or they are known from the literature, e.g. from Journal of the American Chemical Society 16, 391 (arylimino-halocarbonic acid alkyl ester).

The starting materials, if urea-dihalides, especially dichlorides (III), may also be obtained by known methods i.e. by reaction of ureas with phosphorus-pentachloride.

The reactions (I) and (II) which proceed exothermically already at room temperature are advantageously out in organic solvents such as alcohols, acetone, carbon tetrachloride or chlorobenzene; in some cases, however, it is also possible to operate in aqueous media, provided inorganic bases or tertiary amines are added as hydrogen halide acceptors.

Alcohols suitable for the first process described above are inter alia methanol, ethanol, β-chloroethanol, trichloroethanol, allyl alcohol, butanol, glycol monomethyl ether or ethylene glycol.

Amines suitable for the second process described above are inter alia methylamine, dimethylamine, allylamine, dipropylamine, dodecylamine, cyclohexylamine, piperidine, morpholine, aniline or N-methylaniline.

The reaction (III) best is carried out in such inert organic solvents as benzene, xylene or dioxane.

The compounds produced according to this invention are suitable as active substances, especially as herbicides or weed killers, as defoliating agents or generally plant growth controlling agents.

To demonstrate the utility of this invention the N-phenyl-N'.N'-dimethyl-O-methyl-isourea is sprayed, after the addition of the same amount of dimethyl-formamide (solvent) and of 50% of its weight of nonylphenol-polyglycol ether (NP 10) as emulsifier and further dilution with water to a concentration of 1%, on sowings of mustard seed and oats 24 hours after sowing in a quantity of 3 kg. of active ingredient per ha. Mustard seeds and oats first germinate in a normal way, but completely die in the course of 14 days.

The following examples are given for the purpose of illustrating the present invention:

Example 1

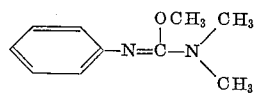

20 grams of phenylimino-chlorocarbonic acid methyl ester are dissolved in 150 ml. of benzene and treated at room temperature with 11 grams of dimethylamine. The temperature rises during this process to about 40° C. the reaction solution is shaken out with water, the organic layer dried over sodium sulfate and, after evaporation of benzene, 20 grams (94% of the theoretical) of N-phenyl-N'.N'-dimethyl-O-methyl-isourea of B.P. 126–128° C./14 mm. Hg are obtained.

The following compounds may be obtained by the same way:

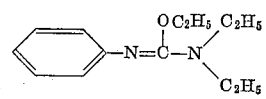

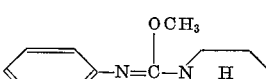

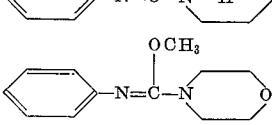

Example 2

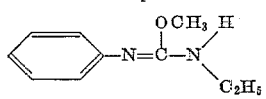

20 grams of phenylimino-chlorocarbonic acid methyl ester are dissolved in 150 ml. of benzene and treated with 50 ml. of a 40% aqueous ethyl amine solution. The temperature slightly rises during the process. The mixture is heated for a further ½ hour and the cold re-action product is shaken with water and, after drying the organic layer, the benzene is evaporated off. 15 grams (72% of the theoretical) of N-phenyl-N'-ethyl-O-methyl-isourea of B.P. 128–130° C./15 mm. Hg remain as residue.

By exactly the same way there may be obtained the compounds of the following formula

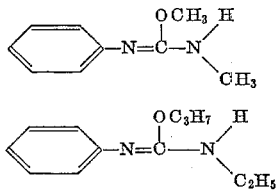

Example 3

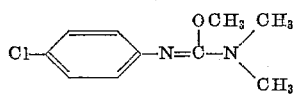

16 grams of p-chlorophenylimino-chlorocarbonic acid methyl ester are dissolved in 100 ml. of benzene and treated at room temperature with 9 grams of gaseous dimethyl amine. The temperature is allowed to rise to 50° C., the mixture is then shaken out with water and the product distilled after removal of the solvent. Thus, 14 grams (84% of the theoretical) of N-(p-chlorophenyl)-N'.N'-dimethyl - O - methyl - isourea are obtained. B.P. 147–149° C./11 mm. Hg.

By exactly the same way there may be obtained the compounds of the following formulae

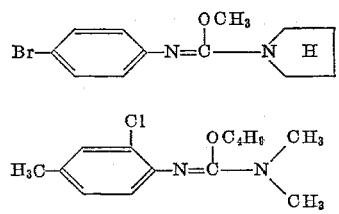

Example 4

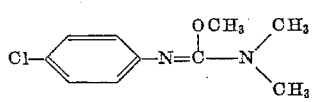

43.5 grams of p-chlorophenylimino-chlorocarbonic acid dimethyl amide are dissolved in 100 ml. of benzene and treated dropwise with 40 ml. of 5 N sodium methylate solution at room temperature. The temperature should not exceed 40° C. After the dropwise addition, stirring is continued for some time. The reaction solution is then shaken out with water, and the separated benzene solution is subsequently concentrated. Upon distillation in a vacuum, 17 grams of N-(p-chlorophenyl)-N'.N'-dimethyl-O-methyl-isourea of B.P. 155–160° C./14 mm. Hg are obtained.

By exactly the same way there may be obtained the compounds of the following formulae

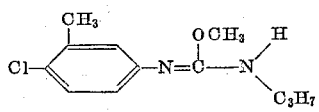

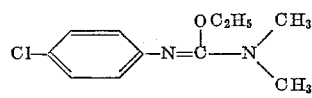

Example 5

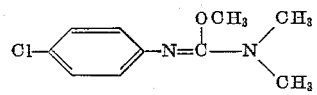

25.3 grams N-(p-chlorophenyl-)-N'.N'-dimethylurea-dichloride are dispersed in 200 ml. of toluene and then treated with 40 ml. of a 5 N sodium methylate solution. The temperature rises slowly. After further heating for 2 hours at the water bath (90–100° C.) the reaction is completed. The mixture is extracted twice with water and the toluene then distilled off in vacuum. The above compound is obtained in excellent yields, distilling at 18 mm. Hg at 160–163° C.

Example 6

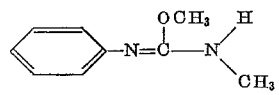

41 grams of N-phenyl-N'-methyl-ureadichloride is dispersed in 300 ml. of toluene and then treated with 80 ml. of a 5 N sodium methylate solution. After further procedure as described in the foregoing example there is obtained the above shown compound, distilling at 15 mm. Hg at 133–135° C.

Example 7

31.3 grams of p-chlorophenyl-isocyanide-dichloride are dissolved in 130 ml. of benzene and treated with 13.8 grams of dimethylamine under ice-water cooling. After finishing the reaction the dimethylamine-chlorohydrate is filtered off with suction. There are obtained after distillation of the solvent 33 grams of the p-chlorophenyl-imino-chlorocarbonic acid dimethyl amide of B.P.₁₀ 157–160° C.

Example 8

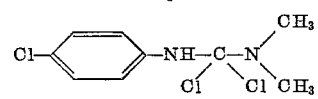

To a suspension of 120 grams of phosphoric-pentachloride in 140 ml. of POCl₃ there are added in small proportions 115 grams of N-(4-chlorophenyl)-N'.N'-dimethyl-yl-urea. Solution occurs while the temperature rises to about 35° C. The solution is heated in the water bath, whereby crystallization occurs at a temperature of 80° C. After continued stirring for 1 further hour in the warmth the reaction product is filtered off with suction and after-washed with benzene. There are obtained 128 grams of the dichloride of M.P. 188–191° C. (decomposition).

We claim:
1. A compound of the formula

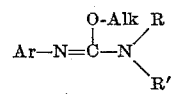

in which Alk is lower alkyl up to 4 carbon atoms; R and R' are alkyl of 1–4 carbon atoms; and Ar is a member selected from the group consisting of 4-chlorophenyl and 3,4-dichlorophenyl.

2. A compound of the formula

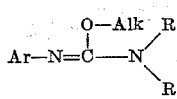

in which Alk is lower alkyl of 1–2 carbon atoms; R and R' are alkyl of 1–4 carbon atoms; and Ar is 3,4-dichlorophenyl.

3. The compound of the following formula
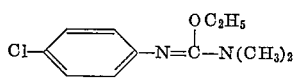
4. The compound of the following formula
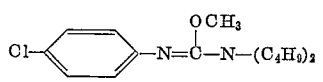
5. The compound of the following formula
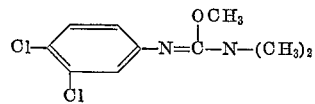
References Cited by the Examiner
UNITED STATES PATENTS
2,849,306    8/1958    Searle _____ 260—564 X
CHARLES B. PARKER, *Primary Examiner.*
FLOYD D. HIGEL, *Assistant Examiner.*